United States Patent
Lowella

[19]

[11] Patent Number: 5,803,508
[45] Date of Patent: Sep. 8, 1998

[54] WALL-ATTACHED PLUMBING CONNECTOR

[75] Inventor: Monty Dale Lowella, Austin, Tex.

[73] Assignee: Connection FX, Inc., Austin, Tex.

[21] Appl. No.: 662,647

[22] Filed: Jun. 13, 1996

[51] Int. Cl.$^6$ ..................................................... F16L 5/00
[52] U.S. Cl. ............................................ 285/64; 285/158
[58] Field of Search ..................................... 285/64, 158

[56] References Cited

U.S. PATENT DOCUMENTS

| | | |
|---|---|---|
| 265,886 | 10/1882 | Stover . |
| 685,694 | 10/1901 | Schamp ..................................... 285/64 |
| 1,179,808 | 4/1916 | Cunningham ............................ 285/158 |
| 2,463,405 | 3/1949 | McMaster ........................... 285/158 X |
| 2,686,353 | 8/1954 | Swarthout . |
| 3,009,167 | 11/1961 | Leonard ............................... 285/64 X |
| 3,563,269 | 2/1971 | Sarsfield . |
| 3,761,116 | 9/1973 | Scheitlin et al. . |
| 3,915,479 | 10/1975 | Sotolongo ............................... 285/158 |
| 4,817,348 | 4/1989 | Wydra .................................. 285/64 X |
| 4,874,189 | 10/1989 | Gardner ................................ 285/64 X |
| 4,929,001 | 5/1990 | Phillips, II ............................. 285/158 |
| 5,052,722 | 10/1991 | Kubo et al. ......................... 285/158 X |
| 5,062,457 | 11/1991 | Timmons ................................ 285/158 |
| 5,074,026 | 12/1991 | MacGregor .............................. 29/523 |
| 5,213,378 | 5/1993 | MacGregor ............................. 285/158 |
| 5,275,199 | 1/1994 | Howell .................................. 137/360 |

Primary Examiner—John A. Ricci
Attorney, Agent, or Firm—LaRiviere, Grubman & Payne

[57] ABSTRACT

The present invention relates to a wall plate terminal, providing a rigid through-wall plumbing connection. A two degree pitch can be provided in the stem portions, providing drainage. The inner wall stem, outer wall stem and the plate are a single integral component. Any manner of plumbing connections, pipes, fixtures, etc. can be connected to either the inner or outer stems.

20 Claims, 4 Drawing Sheets 5,803,508

WALL-ATTACHED PLUMBING CONNECTOR

TECHNICAL FIELD

The present invention relates to a plumbing fixture or adapter, and more particularly to a wall terminal providing a rigid passage for a fixture connection through the wall, and with an option of a built-in two-degree pitch can provide self drainage to attached fixtures. This is particularly advantageous in the use of freeze resistant hose bibs or sill cocks.

BACKGROUND ART

The common practice in the plumbing industry for penetrating or running pipes or lines through a wall is to simply drill a hole in the wall during fabrication of the structure and then run the line or pipe through the hole, or to extend the pipe or line past the framing members sufficiently to allow for sheathing at a later time. Decorative mounts may be placed on the other wall side, but these mounts are merely to hide the hole in the wall and serve no structural function. The solid integral pipe extending through the wall may be connected to a plumbing fixture, such as an isolation valve or faucet on the outer side of the wall, and to a supply line or junction on the inner side of the wall. However, the pipe extending through the wall is not supported against movement or vibration within the wall or structure.

The major drawback of the conventional through-wall system is that the plumbing system installed during the construction or fabrication stage of the building or structure does not provide solid support for the fixture or pipe passing through the wall. The plumbing system is not supported from one side of the wall to the other. However, when repairs or replacements are needed in the plumbing system, it is often necessary to work on the plumbing on both sides of the wall. This often entails destroying a substantial portion of the wall to expose the plumbing. This results in significant expense and labor to make what, in essence, is a relatively simple plumbing repair. The plumbing fixture/adapter will dramatically reduce the costs for job site repairs as well as job site makeup of the rough piping components.

SUMMARY OF INVENTION

In summary, this invention is directed to a plumbing connector which attaches to a framing member during the fabrication of construction (before sheathing is installed). The connector provides a rigid through-wall plumbing connection which essentially separates the plumbing on the finished side of the wall. This eliminates any significant destruction of the wall when fixture replacement or repairs are needed.

OBJECTS OF THE INVENTION

It is an object of the present invention to provide a plumbing adapter for through-wall penetration for securely mounting plumbing systems to a wall while allowing for easy repair and replacement of the plumbing fixtures.

It is another object of this invention to provide a framing mounted adapter for mounting plumbing fixtures, particularly shower heads, faucets, valves, and the like, to a wall for added support. The adapter can be fabricated with a two-degree pitch for self drainage to the stem portions.

It is a further object of at least one embodiment of this invention to provide a fire block at the point where a plumbing system effects a through-wall penetration.

Other objects and advantages of this invention will become apparent from a study of the following portion of the specification, the claims and the attached drawing.

BRIEF DESCRIPTION OF THE DRAWINGS

For a fuller understanding of the present invention, reference is made to the accompanying drawings taken in conjunction with the following detailed description of the Best Mode For Carrying Out The Invention. In the drawings.

DESCRIPTION OF THE PREFERRED EMBODIMENTS

Figures 1, 2:
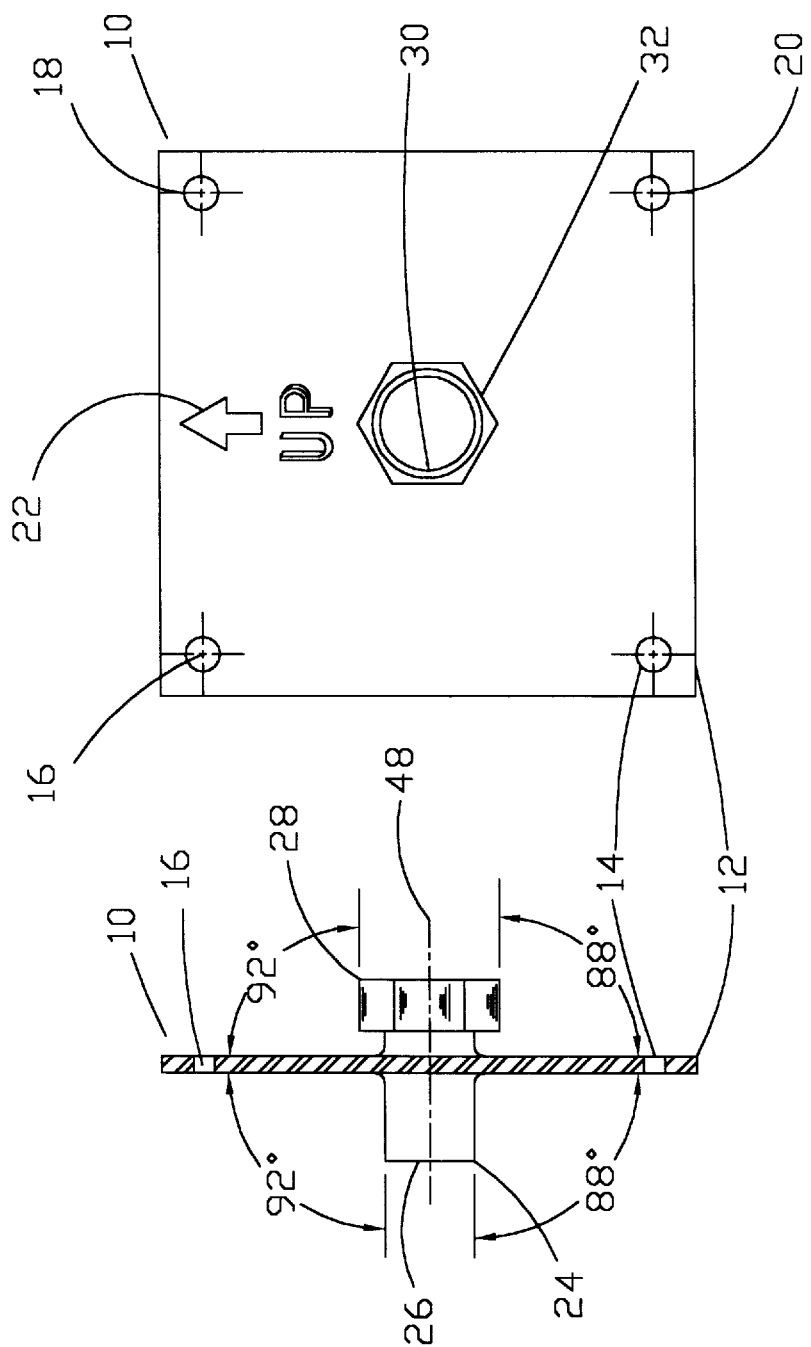
FIG. 1 is a side-elevational view, with parts broken away and parts taken in section, of a first preferred embodiment of the wall-attached plumbing connector of this invention.
FIG. 2 is an front elevational view thereof.
Figure 3:
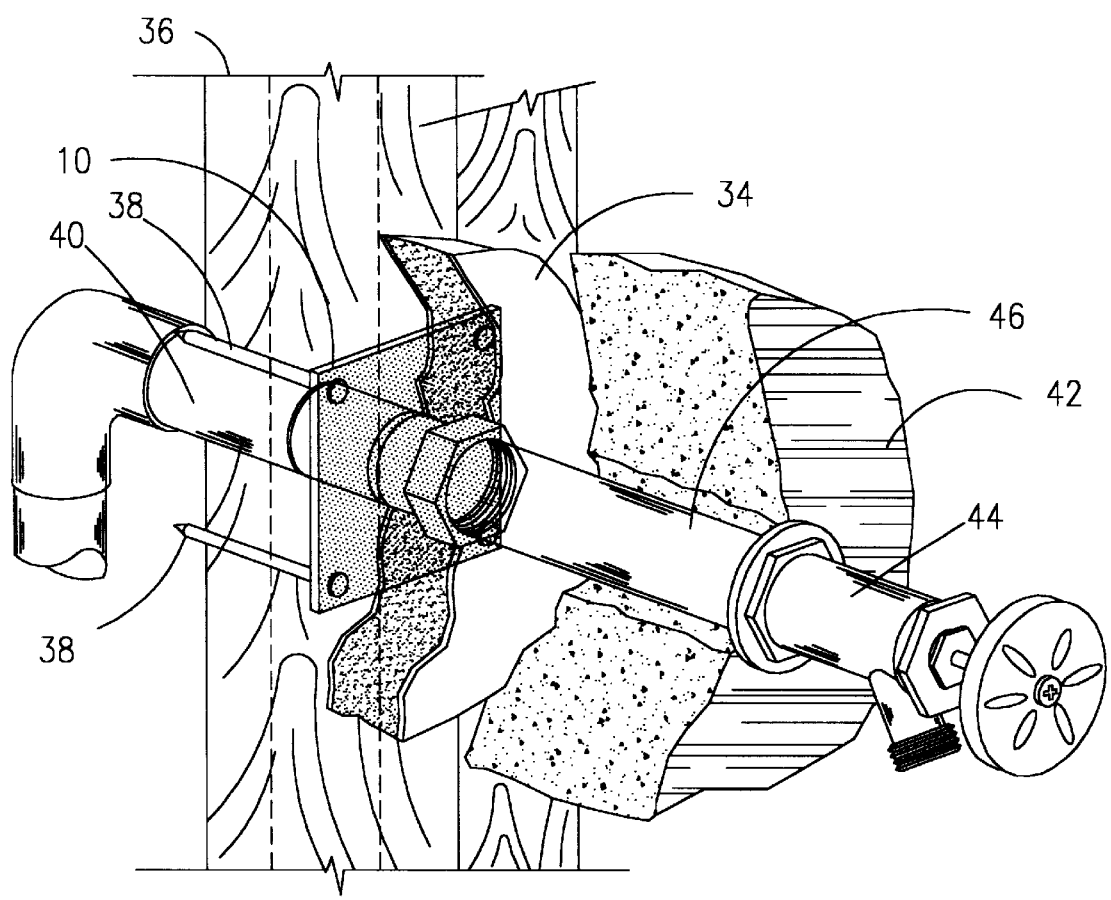
FIG. 3 is a perspective view thereof showing the connectors of FIGS. 1 and 2 installed in the exterior wall of the structure and having plumbing connected thereto.

The first preferred embodiment of the wall-attached plumbing connector of this invention is generally indicated at 10 in FIGS. 1, 2 and 3. The connector 10 comprises a wall plate 12 which is rectangular or square in configuration, as shown in FIG. 2. The wall plate has fastener holes 14, 16, 18 and 20 adjacent its four corners. The fastener holes are spaced an appropriate distance for attachment to the building structure to which it is attached. In one preferred embodiment, holes 14, 16, 18, and 20 are equally spaced three inches apart from one another. In addition to those fastener holes, additional holes can be provided as would be appropriate for particular installations. The wall plate 12 carries indicia 22 which indicates the up direction for reasons which are described below.

While wall plate 12 in a preferred embodiment is shown as a substantially square structure, it will be obvious to those of ordinary skill in the art that the shape of wall plate 12 can be highly application specific. Accordingly, the principles of the present invention specifically contemplate the formation of wall plate 12 as any geometric shape required for a given application. Such shapes include, but are not limited to triangles, squares, rectangles, regular and irregular polygons, circles, arcs, circular sections, ellipses, and elliptical sections.

Connector tube 24 has an opening therethrough and extends out of both sides of the wall plate, as seen in FIG. 1. The outside of the wall plate is the side seen in FIG. 2, which carries the indicia thereon. The inside portion 26 of the connector tube extends inward from plate 12, and the outside portion 28 extends outward from plate 12. The inside portion 26 of the connector tube defines an inner surface to receive a connecting plumbing fitting. The surface may be threaded for insertion of pipes or nipples, or may be slip-fit for soldered copper or glued synthetic polymer tube to be attached. The outside portion 28 is similar and has a female threaded surface 30 for the introduction of a nipple, pipe or the like. The exterior of the outside portion is a hexagonal surface 32 to which a wrench can be applied to counteract applied torque during the insertion and removal of a threaded pipe into the threaded surface 30.

The wall-attached plumbing connector 10 provides a rigid mounting through walls for plumbing systems during the fabrication stage of construction by mounting to the framing members which can be horizontally or vertically constructed for attachment of the invention. The connector 10 is particularly suited to be made of copper, chrome plate, brass, stainless steel, corrosion-resistant steel, and synthetic polymer composition material such as PVC and CPVC or other polymers. Where connector 10, and especially plate 12 thereof are formed of fire-proof, fire-retardant, or fire-resistant materials, (such as brass or stainless steel) connector 10 can further serve as a fire block at the point where the plumbing system effects the wall penetration. The connector comprises a wall mount that has an inner wall contacting surface and an outer portion of sufficient length to extend through a wall of predetermined thickness. The outer portion, which penetrates the wall sheathing, defines an inner and outer diameter sufficient for a pipe or fixture of predetermined diameter to be attached.

In this manner, the inside portion and the outside portion, separated by a plate secured to the framing member, define a rigid plumbing passage through a wall to which can be soldered, glued or fitted, in any manner, a plumbing fixture or pipe by adapting variations of connections between the inner and outer tube portions. This would include, but not be limited to variations such as female to male threads, female thread to solder joint, male thread to solder joint, male thread to male thread, female thread to male thread, female threaded to female thread, etc. The connections are secured to the wall by a flange or plate 12 which is attached to the wall with screws or nails to the framing member. This provides backup or rigidity for installation and removal for repairs of a fixture or pipe from the finished side of a wall.

The outside portion 28 of the connector tube 24 penetrates the sheathing 34, as seen in FIG. 3. It includes a circumferential engagement portion so that the wall plate and stem can be secured for attachment of fixtures using something such as a hexagonal shaped circumference for engagement by a wrench or like device. In an alternative preferred embodiment, it is not necessary that the supply pipe extending into the inner wall connection and the pipe or fixture extending from the outer wall connection be of the same diameter. For example, a three-quarter inch supply line may be inserted into the inner wall connection, whereas a half-inch line may extend from the outer wall connection, with the plate securing the fittings to the framing separately and adapting the two size connectors together.

FIG. 3 shows the connector 10 installed on a wall. The wall has studs 36 onto the exterior of which is secured the sheathing 34. Before the sheathing is installed, the connector 10 is secured in place, as by nails 38 through the holes in the corner of the plate 12. Interiorly of the wall, the inside pipe 40 is attached to the inside portion 26. The illustrated pipe is a soldered copper tubing. In such a case, the connector 10 is made of copper or brass to be compatible with the soldering connection. If the interior piping is of synthetic polymer composition material, then the inside portion 26 needs to be threaded to be connectable thereto or needs to be made of a material which is suitable for gluing thereto. The connector 10 is thus made of one piece of material, and the material is chosen to be compatible with the piping system. As is seen in FIG. 3, the outside portion 28 extends through the sheathing 34. When the exterior siding 42 is applied, a nipple or other extender is screwed into the exterior portion to protect the tube 24 and to provide a hole in the siding through which a fitting can be installed after completion of the siding. In the present case, hose bib 44 with an integral long nipple 46 is installed upon completion of the exterior siding 42.

In those cases where the fitting is to be used out through an exterior wall, such as to carry a hose bib, as illustrated in FIG. 3, it is preferable that the inside and outside portions of the connector tube each be angled slightly downward with respect to the horizontal axis 48. This is to permit drainage of both the interior and exterior plumbing with respect to plate 12. As indicated in FIG. 1, the axes of these portions each have about a 2 degree downslope with respect to the axis. For this reason, the indicia 22 is provided to make sure the connector is correctly installed.

The connector 10 can also be used on an interior wall of the structure. It may be used to carry a shower arm and shower head. It may be used for installation of a toilet supply valve, or the like.

Figure 4:
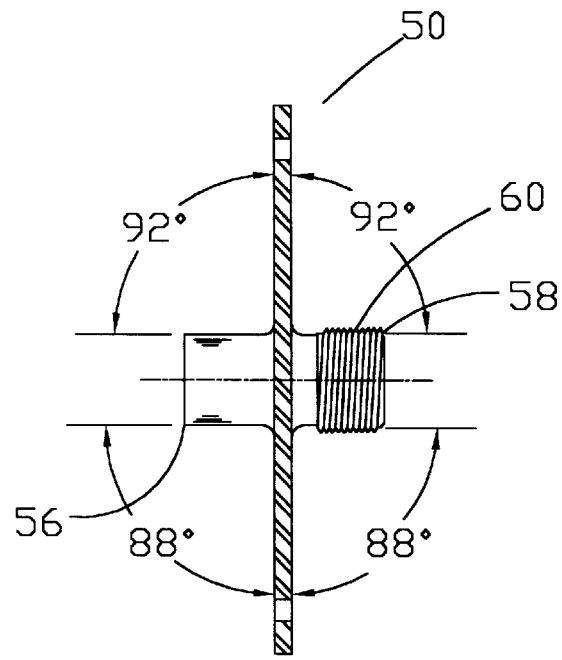
FIG. 4 is a side-elevational view, with parts broken away and parts taken in section, of a second preferred embodiment of the wall-attached plumbing connector of this invention.
Figure 5:
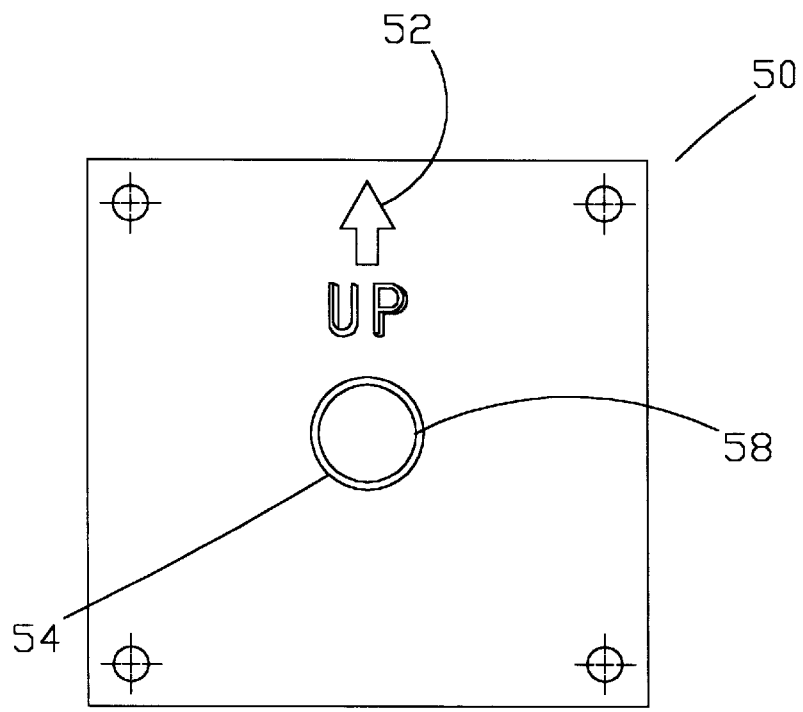
FIG. 5 is a front-elevational view of the connector of FIG. 4.
Figure 6:
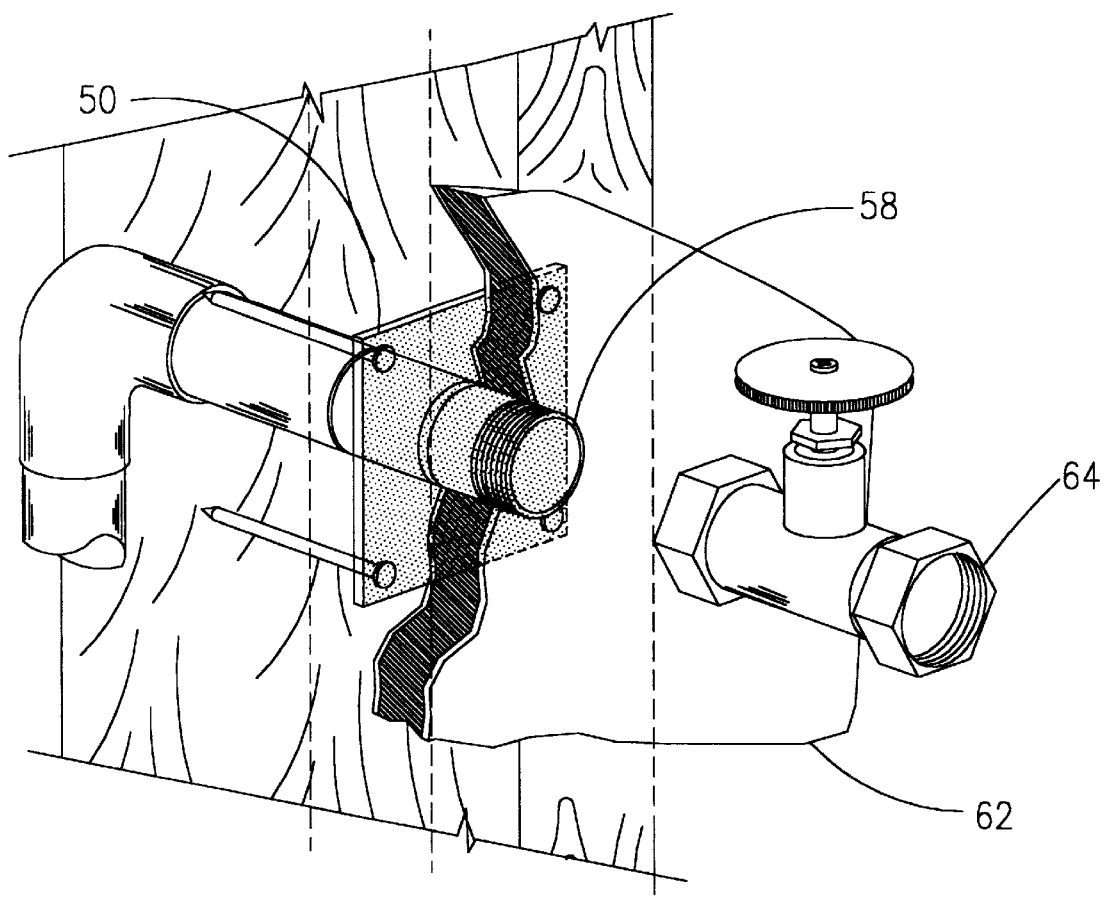
FIG. 6 is a perspective view of the plumbing connector of FIG. 4 installed in the wall of a structure and having plumbing connected thereto.

The connector 50 shown in FIGS. 4, 5 and 6 has the same wall plate with its fastener holes. It also has indicia 52, which indicates the up direction. It has a connector tube 54 which has an interior portion 56 and exterior portion 58. As contrasted to the connector 10, the exterior portion 58 has screw threads 60 on the exterior thereof. The exterior portion 58 is sufficiently long with respect to the wall plate that the threaded portion extends out past the wall material 62, which is secured to the studs over the plate of connector 50. The screw-threaded portion 60 thus extends beyond the wall material. Valve 64 can be threaded thereon to control outflow of liquid. This structure is particularly suitable for the water supply tube to a toilet, but can be employed in many other similar uses. In FIG. 6, the valve 64 is shown in exploded position. As seen in FIG. 4, both the interior and exterior portions of the connector tube are downsloped. In this way, a through-wall plumbing connector is securely affixed to the structure for rigid attachment on both sides of the plumbing connector.

The plumbing connector is preferably made in a single part, such as by casting or molding. Post casting machining may be required to clear the bore through the center, cut the threads, and/or machine a smooth cylindrical surface for the soldering of copper tube therein. The casting of the structure in a single piece is particularly useful when the inside portions and outside portions of the connector tube are not axially aligned, but are each aligned at 88 degrees with respect to the plane of the wall plate. However, the structure can be made of two parts. The connector tube can be fashioned, preferably with a flange in the proper location, and the connector tube can be inserted into an opening in the wall plate and soldered, brazed or welded therein.

This invention has been described in its presently contemplated best modes, and it is clear that it is susceptible to numerous modifications, modes and embodiments within the ability of those skilled in the art and without the exercise of the inventive faculty.

What is claimed is:

1. A plumbing connector for effecting a plumbing penetration through a wall, the wall including a framing member having sheathing of pre-determined thickness applied thereto, the plumbing connector comprising:

a plate element, means on said plate element for connection of said plate element to said framing member prior to application of said sheathing to said framing member;

a connector tube rigidly disposed through and rigidly connected to said plate element, said connector tube having an inside portion for placement away from said sheathing, said inside portion of said connector tube defining a first bore having a first predetermined diameter, and an outside portion for placement through said sheathing, said outside portion of said connector tube defining a second bore having a second predetermined diameter, the length of said outside portion defining a predefined length required by said predetermined thickness of said sheathing;

first plumbing connection means, disposed at an outer end of said inside portion of said connector tube, for receiving at least one of pipe and plumbing fitting; and second plumbing connection means, disposed at an outer end of said outside portion of said connector tube, for receiving at least one of pipe and plumbing fitting, whereby said at least one of said pipe and said plumbing fixture received in said second plumbing connection means is positioned a predetermined distance from an outer surface of said wall.

2. The plumbing connector of claim 1 wherein at least one of said inside portion and outside portion of said connector tube secured to said plate element is at an acute angle with respect to the plane of said plate element.

3. The plumbing connector of claim 2 further including indicia on said wall plate, said indicia indicating which side of said plate element is up when said acute angle between said outside portion and said plate element is down.

4. The plumbing connector of claim 2, wherein both said inside portion and said outside portion of said connector tube are at an acute angle with respect to the plane of said plate element and said acute angles lie in the same plane and lie on the same side of the center line through said connector perpendicular to said plate element.

5. The plumbing connector of claim 4 further including indicia on said plate element, said indicia indicating which side of said plate element is up when said acute angle between said outside portion and said plate element is down.

6. The plumbing connector of claim 5 wherein said plumbing connector is made of one piece of material.

7. The plumbing connector of claim 1 wherein at least one of said first and said second plumbing connection means is selected from the group consisting of: screw thread; internal screw thread; external screw thread; slip-fit; solder slip-fit; and glue slip-fit.

8. The plumbing connector of claim 1 formed of a material selected from the group consisting of: copper; chrome plate; brass; stainless steel; corrosion-resistant steel; and synthetic polymer.

9. The plumbing connector of claim 1 wherein said means on said plate element for connection of said wall plate to said framing member further comprises said wall plate defining a plurality of openings for placement of fasteners therethrough for penetration into said framing member.

10. The plumbing connector of claim 1 further comprising a fire block at the point where a plumbing system effects said plumbing penetration through said wall, said plumbing connector being formed of a material selected from the group consisting of: fire-proof material; fire-retardant material; and fire-resistant material.

11. The plumbing connector of claim 1 further comprising a hexagonal surface disposed upon an exterior part of said outside portion of said connector tube, whereby a wrench can be applied to said hexagonal surface to counteract applied torque during the insertion and removal of at least one of a threaded pipe and a threaded plumbing fitting into one of said first and said second plumbing connection means.

12. The plumbing connector of claim 1 wherein said at least one of said inside portion and said outside portion of said connector tube is disposed substantially perpendicularly with respect to said plate element.

13. The plumbing connector of claim 1 wherein said first predetermined diameter of said first bore of said inside portion of said connector tube is substantially equal to said second predetermined diameter of said second bore of said outside portion of said connector tube.

14. The plumbing connector of claim 1 further for adapting a first one of said pipe and said plumbing fitting having a first size to a second one of said pipe and said plumbing fitting having a second size, the plumbing connector further comprising said first predetermined diameter of said first bore of said inside portion of said connector tube being substantially different from said second predetermined diameter of said second bore of said outside portion of said connector tube.

15. The plumbing connector of claim 1 further for installation on a framing member selected from the group consisting of horizontal framing member and vertical framing member.

16. A plumbing connector for effecting a plumbing penetration through a wall, the wall including a framing member having sheathing of pre-determined thickness applied thereto, the plumbing connector comprising:

a plate element, said plate element defining a plurality of openings for placement of fasteners therethrough for penetration into said framing member whereby said plumbing connector is rendered attachable to said framing member prior to application of said sheathing to said framing member;

a connector tube rigidly and substantially perpendicularly disposed through said plate element, said connector tube having an inside portion for placement away from said sheathing, said inside portion of said connector tube defining a first co-axial bore having a first predetermined diameter, and an outside portion for placement through said sheathing, said outside portion of said connector tube defining a second co-axial bore having a second predetermined diameter, the length of said outside portion defining a predefined length required by said predetermined thickness of said sheathing;

first plumbing connection means, disposed at an outer end of said inside portion of said connector tube, for receiving at least one of said pipe and said plumbing fitting, said first plumbing connection means being selected from the group consisting of screw thread, internal screw thread, external screw thread, slip-fit, solder slip-fit, and glue slip-fit;

second plumbing connection means, disposed at an outer end of said outside portion of said connector tube, for receiving at least one of said pipe and said plumbing fitting, said second plumbing connection means being selected from the group consisting of screw thread, internal screw thread, external screw thread, slip-fit, solder slip-fit, and glue slip-fit;

whereby said at least one of said pipe and said plumbing fixture received in said second plumbing connection means is positioned a predetermined distance from an outer surface of said wall.

17. The plumbing connector of claim 16 wherein said plate element and said connector tube are integrally formed.

18. The plumbing connector of claim 16 wherein said outside portion has a center line and said center line is at an acute angle with respect to the exterior surface of said plate element.

19. The plumbing connector of claim 18 wherein there is indicia on said outside portion of said plate element indicating an upward direction and said indicia is opposite said acute angle.

20. The plumbing connector of claim 16 further for installation on a framing member selected from the group consisting of horizontal framing member and vertical framing member.

* * * * *

UNITED STATES PATENT AND TRADEMARK OFFICE
CERTIFICATE OF CORRECTION

PATENT NO  : 5,803,508
DATED      : September 8, 1998
INVENTOR(S): Monty Dale Lowell It is certified that error appears in the above-identified patent and that said Letters Patent is hereby corrected as shown below:

On the title page, item [19], below "United States Patent" delete "Lowella" and insert therefor --Lowell--.

On the title page, item [75] Inventor:, delete "Lowella" and insert therefor --Lowell--.

Signed and Sealed this

Sixteenth Day of February, 1999

Attest:

Attesting Officer

Acting Commissioner of Patents and Trademarks